United States Patent
Pastore et al.

(10) Patent No.: US 9,716,726 B2
(45) Date of Patent: Jul. 25, 2017

(54) METHOD OF IDENTIFYING AND COUNTERACTING INTERNET ATTACKS

(71) Applicant: Cleafy S.r.l., Trento (IT)

(72) Inventors: Nicolò Pastore, Pero (IT); Emanuele Parrinello, Crema (IT); Carmine Giangregorio, Milan (IT)

(73) Assignee: Cleafy S.r.l., Trento (IT)

( * ) Notice: Subject to any disclaimer, the term of this patent is extended or adjusted under 35 U.S.C. 154(b) by 57 days.

(21) Appl. No.: 14/701,115

(22) Filed: Apr. 30, 2015

(65) Prior Publication Data

US 2016/0142438 A1 May 19, 2016

Related U.S. Application Data

(60) Provisional application No. 62/079,337, filed on Nov. 13, 2014.

(51) Int. Cl.
*H04L 29/06* (2006.01)
*H04L 29/08* (2006.01)
*G06F 21/55* (2013.01)

(52) U.S. Cl.
CPC ........ *H04L 63/1466* (2013.01); *G06F 21/554* (2013.01); *H04L 63/0281* (2013.01);
(Continued)

(58) Field of Classification Search
CPC . H04L 63/1466; H04L 63/08; H04L 63/1416; H04L 67/02; H04L 63/061;
(Continued)

(56) References Cited

U.S. PATENT DOCUMENTS

| 6,792,543 B2 * | 9/2004 | Pak ........................ G06F 21/56 707/999.2 |
| 7,263,188 B2 * | 8/2007 | Kohno ............ G11B 20/00086 380/231 |

(Continued)

OTHER PUBLICATIONS

Timmermans and Kloosterman, "Detecting client-side e-banking fraud using a heuristic model", University of Amsterdam, Jul. 11, 2013.

*Primary Examiner* — Yonas Bayou
(74) *Attorney, Agent, or Firm* — MH2 Technology Law Group, LLP

(57) ABSTRACT

The present disclosure relates to a method of identifying and counteracting Internet attacks, of Man-in-the-Browser and/or Man-in-the-Middle and/or Bot attack types, comprising the steps of: generating a request by a Web browser, concerning a Web application residing in a Web server; sending the request by the Web browser to a box server, which is in signal communication with the Web server; receiving a server DOM code by the box server, which code has been automatically generated by the Web server according to the request; sending a service page code by the box server to the Web browser, in response to the request, the service page code comprising an obfuscated and polymorphic javascript code and/or HTML code; receiving and processing the javascript code and/or HTML code, by the Web browser, to automatically generate an asynchronous request, such that environment data of the Web server may be transmitted to the box server; processing the environment data by the box server, to identify Internet attacks; performing an encryption function on the server DOM code by the box server to generate an obfuscated DOM code, and sending the obfuscated DOM code to the Web browser in response to the asynchronous request; performing a decryption function on the obfuscated DOM code by the service page code, to
(Continued)

obtain the server DOM code; rendering the server DOM code by the Web browser.

14 Claims, 4 Drawing Sheets

(52) U.S. Cl.
CPC ........ *H04L 63/0428* (2013.01); *H04L 63/061* (2013.01); *H04L 63/08* (2013.01); *H04L 63/0876* (2013.01); *H04L 63/1416* (2013.01); *H04L 67/02* (2013.01); *G06F 2221/032* (2013.01); *G06F 2221/2107* (2013.01); *H04L 63/067* (2013.01)

(58) Field of Classification Search
CPC ............. H04L 63/0876; H04L 63/0281; H04L 63/0428; H04L 63/067; G06F 21/554; G06F 2221/2107; G06F 2221/032
See application file for complete search history.

(56) References Cited

U.S. PATENT DOCUMENTS

| | | | | |
|---|---|---|---|---|
| 8,627,442 | B2 * | 1/2014 | Ji | H04L 63/0245 |
| | | | | 726/11 |
| 8,844,047 | B2 * | 9/2014 | Peirce | G06F 21/572 |
| | | | | 726/26 |
| 8,909,938 | B2 * | 12/2014 | Azar | G06F 21/32 |
| | | | | 713/186 |
| 8,935,809 | B2 * | 1/2015 | Burckart | G06Q 30/0645 |
| | | | | 726/30 |
| 9,152,770 | B2 * | 10/2015 | Matsushima | G06F 21/10 |
| 9,237,130 | B2 * | 1/2016 | Ji | H04L 63/0245 |
| 9,401,807 | B2 * | 7/2016 | Kisielewicz | H04L 9/0891 |
| 9,509,553 | B2 * | 11/2016 | Levy | H04L 67/34 |
| 2002/0166051 | A1 | 11/2002 | Moser | |
| 2009/0327411 | A1 * | 12/2009 | Dang | H04L 63/123 |
| | | | | 709/203 |
| 2011/0239300 | A1 | 9/2011 | Klein et al. | |
| 2011/0247075 | A1 * | 10/2011 | Mykland | G06F 21/10 |
| | | | | 726/26 |

* cited by examiner

METHOD OF IDENTIFYING AND COUNTERACTING INTERNET ATTACKS

CROSS-REFERENCE TO RELATED APPLICATION

This application claims the benefit of U.S. Provisional Patent Application Ser. No. 62/079,337 filed Nov. 13, 2014, which is incorporated herein by reference.

FIELD OF THE INVENTION

The present disclosure relates to tools, techniques, processes, and systems of detecting and counteracting Internet attacks. Particularly, the present disclosure relates to a method of detecting and counteracting Man-in-the-Browser and/or Man-in-the-Middle and/or Bot attacks. In other words, the present invention allows monitoring and protection of a Web application or a Web browser against attacks directed to the Web browser of a client.

BACKGROUND INFORMATION

Antivirus software is known to be used in the art for counteracting computer security attacks, including Man-in-the-Browser and/or Man-in-the-Middle and/or Bot attacks.

For example, Man-in-the-Browser is a type of attack that consists in direct manipulation of the Web browser to change the contents that are normally displayed to the user when he/she visits a Website (see FIG. 1). Man-in-the-Browser (MitB) attacks are carried out using malware installed on the computer without the user's knowledge. Such malware (e.g., Proxy Trojan horses) interact with the memory of Web browser processes, to redirect the normal flow of system calls (used by the Web browser) to certain malware functions, which have the purpose, for instance, of injecting additional HTML code into the downloaded Web page. It should be noted that, in the case of the Man-in-the-Browser attack, a connection is established with the original Web server of the site that has been attacked, which makes attack detection difficult. Therefore, the Web browser and the Web application are unable to identify the contents that has been added by the malware to the contents that has been actually downloaded by the Web browser. Various Man-in-the-Browser attacks have been acknowledged, including credit card data theft from e-banking and e-commerce sites and fraudulent transactions that are often automatically started with no interaction with the user.

More in detail, when a user requests a Web page (i.e., a Web application) through a Web browser, the Web server that hosts the Web page sends a HTML source code (a Document Object Model, DOM) to the Web browser. The DOM code is transferred to the rendering engine of the Web browser for display to the user. For example, in a malware-infected PC, the DOM code received by the Web browser from the Web server is changed by the malware before it is processed by the rendering engine of the Web browser. For this purpose, the malware injects an additional code (e.g., a script) into the DOM code it has received from the Web server to change the contents displayed to the user. The changes made by the malware to the DOM code downloaded from the Web server are changes in the HTML and/or javascript codes and/or any other contents or Web resource. In other words, the Web browser is connected to the original Web server while the malware makes changes to the downloaded DOM code. These changes may include graphic and/or behavioral alterations. Therefore, a Web page is displayed to the user, which has been changed in its behavior and/or graphic representation, from the Web page that was originally requested by the client. The client unwillingly allows access to its own personal data or authorizes fraudulent transactions on his/her own account.

For example, in the field of banking, a malware-infected computer typically logs into the on-line banking site using a HTTPS protocol, and downloads the Web page data. Nevertheless, the malware alters this data in real-time, by adding transaction-manipulating scripts, and performing, for instance, automatic data transfers. The script can also redirect money transfers that were actually ordered by the user to other recipients, or more simply request credit card data and/or add additional fields to be filled in by the user with additional data.

A further example is the Bot attacks, as shown in FIG. 1. These attacks consist of page requests that come from an automatic system instead of a person. This may involve a huge bandwidth consumption for the service provider. Furthermore, automatic systems may use the service in undesired and unlawful manners. Examples known in the art are Web scraping (i.e., extraction of information from the Web service), Carding (i.e., the process of validation of stolen credit cards) or the Brute-force attack (i.e., the attempt of searching for the credential of a user in the login page of a Web application).

U.S. Patent Application Publication No. US2002/0166051A1 discloses an encryption function performed on the DOM code of a Web application. The DOM code is available on the Web server in combination with a decryption program. When a user requests the Web application, an encrypted DOM code is provided in response to such request. This encrypted DOM code cannot be rendered by the client that requested it. This is because only an authorized client may access the decryption program available on the Web browser, which allows it to decrypt the DOM code in order to access the Web application.

Antivirus software, installed either on PCs or on client user devices (e.g., smartphone, tablets, etc.) are poorly effective against this type of computer security threat. Antivirus software can only identify part of Man-in-the-Browser attacks occurring over the Internet. Web browsers are also known which meet high security standards or have Internet security software. Nevertheless, none of the prior art solutions can effectively counteract Man-in-the-Browser and/or Man-in-the-Middle and/or Bot attacks.

For example, even when DOM codes are encrypted, decryption codes can still be obtained through attacks directed to the Web server that contains the decryption program. Furthermore, although the code is encrypted, it is still immediately provided to the client that requests it. Therefore, attacks are still possible, because there is a high risk that decryption keys may be identified by individuals who make such attacks.

SUMMARY OF THE INVENTION

It is an object of the present invention to provide a method of preventing Internet attacks.

A further object of the present invention is to provide a method of identifying and counteracting Man-in-the-Browser and/or Man-in-the-Middle and/or Bot attacks.

Another object of this invention is to provide a method of detecting the changes made by a malware to the HTML and/or javascript codes of the DOM of the Web page and/or Web resource that has been downloaded by a user and certify that the contents and/or DOM of the Web resource and/or page transmitted to a given client is actually what is displayed to or used by it.

One embodiment provides a method that allows monitoring and handling of the flow of HTTP and/or HTTPS requests made by a user and transferred between the Web browser and the Web application being monitored.

A further embodiment provides a method that protects the downloaded DOM code and prevents it from being accessed by malware.

Yet another embodiment provides a method of identifying any alteration to the DOM code that has been actually downloaded from the Web server. This will allow identification of a Man-in-the-Browser and/or Man-in-the-Middle and/or Bot attacks, to ensure that the requested Web page will be properly displayed to the user.

An aspect of the present invention is to provide a method of identifying and counteracting Internet attacks, of Man-in-the-Browser and/or Man-in-the-Middle and/or Bot attack types, comprising: generating a request by a Web browser, concerning a Web application residing in a Web server, sending said request by said Web browser to a box server, which is in signal communication with said Web server, receiving a server document object model (DOM) code by said box server, which code has been automatically generated by said Web server according to said request, sending a service page code by said box server to said Web browser, in response to said request, said service page code comprising an obfuscated and polymorphic javascript code and/or HTML code, receiving and processing said javascript code and/or HTML code, by said Web browser, to automatically generate an asynchronous request, wherein environment data of said Web server is transmitted to said box server, processing said environment data of said Web browser, by said box server, to identify Internet attacks of the Man-in-the-Browser and/or Man-in-the-Middle and/or Bot attack types, performing an encryption function on said server DOM code by said box server to generate an obfuscated DOM code, and sending said obfuscated DOM code to said Web browser in response to said asynchronous request, performing a decryption function on said obfuscated DOM code by said service page code, to obtain said server DOM code, and rendering said server DOM code by said Web browser.

Another aspect of the present invention is to provide a system for identifying and counteracting Internet attacks, of Man-in-the-Browser and/or Man-in-the-Middle and/or Bot attack types, the system comprising: a box server programmed with instructions for receiving a request generated by a Web browser, concerning a Web application residing in a Web server, receiving a server document object model (DOM) code automatically generated by said Web server according to said request, sending a service page code to said Web browser, in response to said request, said service page code comprising an obfuscated and polymorphic JavaScript code and/or HTML code, receiving environment data of said Web browser, wherein said Web browser has received and processed said JavaScript code and/or HTML code to automatically generate an asynchronous request, processing said environment data of said Web browser to identify Internet attacks of the Man-in-the-Browser and/or Man-in-the-Middle and/or Bot attack types, performing an encryption function on said server DOM code to generate an obfuscated DOM code, sending said obfuscated DOM code to said Web browser in response to said asynchronous request, and said service page code programmed for performing a decryption function on said obfuscated DOM code to obtain said server DOM code.

These and other aspects of the present invention will be more apparent from the following description.

BRIEF DESCRIPTION OF THE DRAWINGS

The characteristics and advantages of the present disclosure will appear from the following detailed description of a possible practical embodiment, illustrated as a non-limiting example in the set of drawings, in which.

DETAILED DESCRIPTION

Even when this is not expressly stated, the individual features as described with reference to the particular embodiments shall be intended as auxiliary to and/or interchangeable with other features described with reference to other exemplary embodiments.

The present invention relates to a method of identifying and counteracting Internet attacks, particularly Man-in-the-Browser and/or Man-in-the-Middle and/or Bot attacks.

Figure 1:
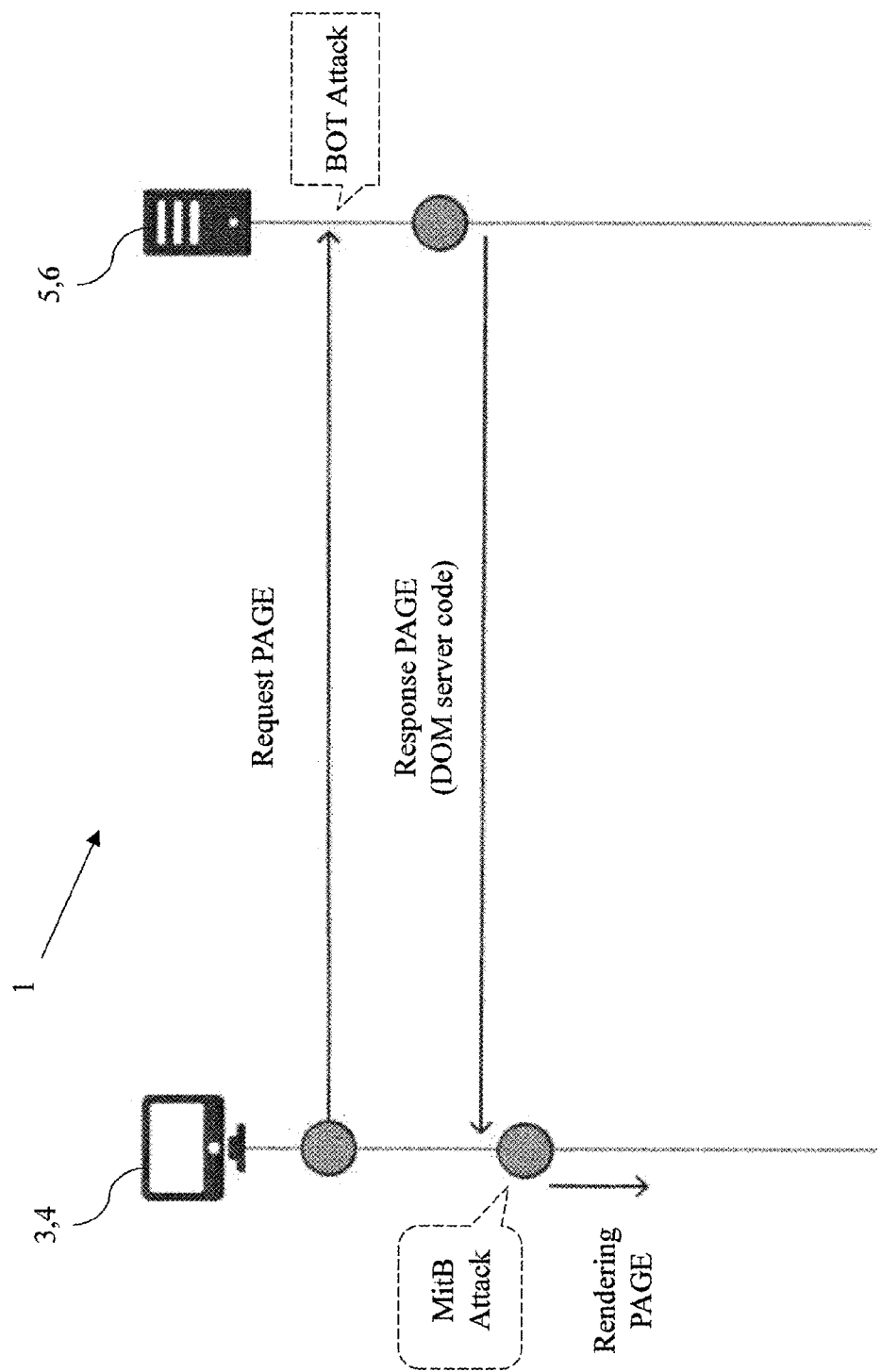
FIG. 1 shows a flowchart of an example of an Internet attack.

For example, FIG. 1 shows a flowchart of an example, not forming part of the present invention, of an Internet attack of the Man-in-the-Browser and/or Bot attack type.

In the figures, numeral 1 designates a system 1 in which the method of the present invention may be implemented. In other words, the system 1 is designated as network environment allowing implementation of the method of the present invention.

Figure 2:
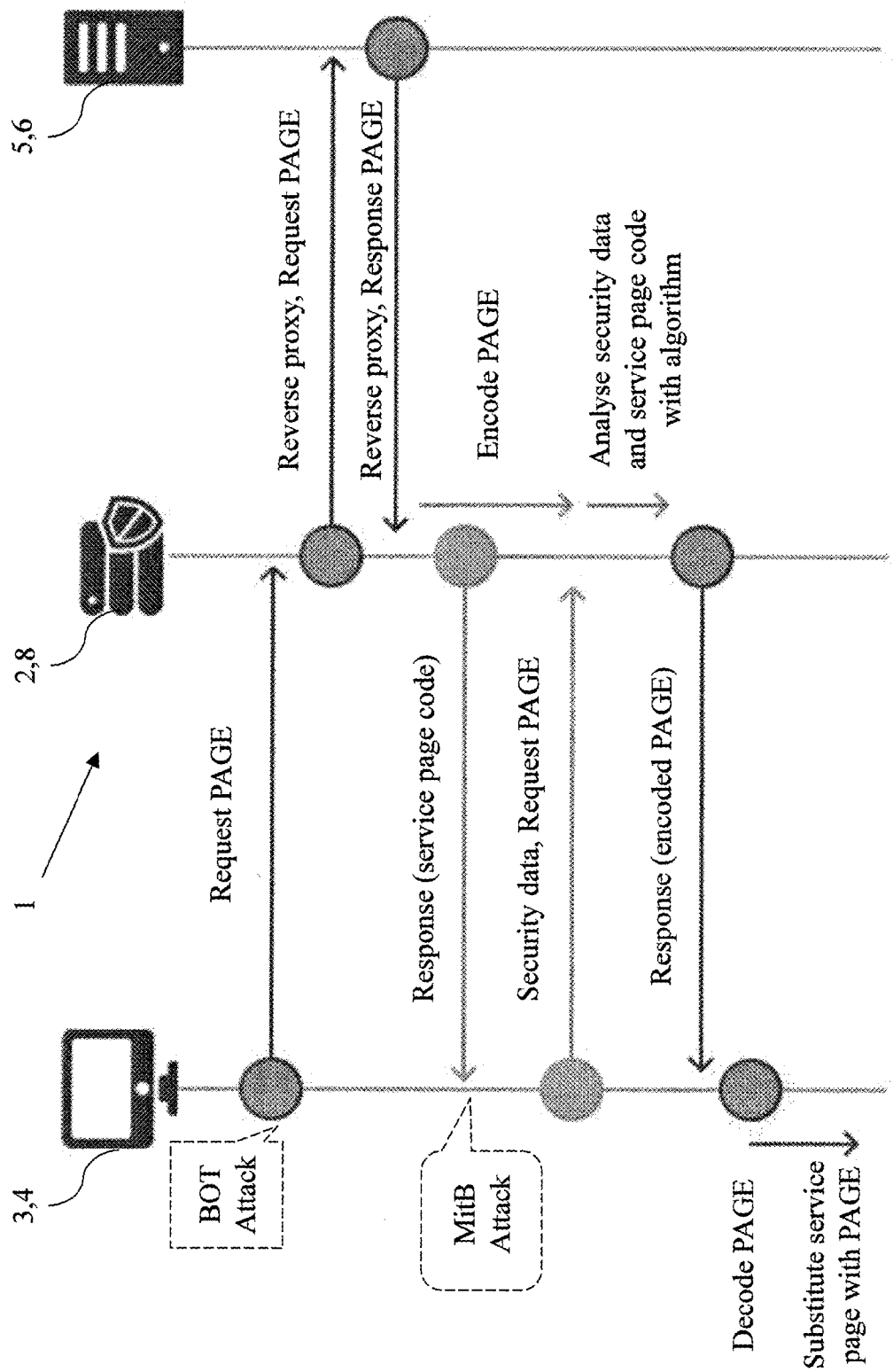
FIG. 2 shows a flowchart of an example of the method of identifying and counteracting Internet attacks of FIG. 1.

Referring to FIG. 2, the method of identifying and counteracting Internet attacks of the Man-in-the-Browser and/or Man-in-the-Middle and/or Bot attack types comprises a step of generating a request (e.g., a GET, POST request), by a Web browser 4, concerning a Web application 6 (e.g., a Web page) residing in a Web server 5. Preferably, the request is generated when a user of the Web browser 4 enters a URI or URL for the Web application 6. More preferably, the method includes the step of sending the request using a HTTP or HTTPS protocol.

The method also includes the step of sending the request by the Web browser 4 to a box server 2 which is in signal communication with the Web server 5.

For example, the method uses a box server 2 in signal communication with at least one client computer 3 with a Web browser residing therein for Internet browsing. The box server 2 is in signal communication with a Web server 5 with a Web application 6 residing therein. In one aspect, a user can use the Web browser 4 in the client computer 3 to request a Web application 6 (e.g., a Web page) residing in a Web server 5. In other words, a user (or client) uses the Web browser 4 installed in the client computer 3 to access a Web page. Obviously, during use, the client computer 3 shall be connected to an Internet network through wired or mobile telephone equipment or any other known communication method. The box server 2 is configured to receive at least one request associated with the Web application 6 from the Web browser 4 and to send such request to the Web server 5.

The method also includes the step of receiving a server DOM code by the box server 2, which code has been automatically generated by the Web server 5 according to the request.

For example, the box server 2 is configured to receive a request-related server DOM code from the Web server 5. Namely, the request is generated by the Web browser 4 when the user uses the Web browser 4 to request a URL (Uniform Resource Locator) that uniquely identifies the address of an Internet resource (i.e., the Web application 6) residing in the Web server 5. For example, the box server 2 is configured to receive at least the request associated with the Web application 6 from the Web browser 4 using the HTTP or HTTPS protocol and to send such request to the Web server 5.

By way of example, when the user requests a page from the Website of the Web application 6, with a particular network configuration (e.g., by making changes to the DNS keys for the Website domain to be contacted) or load balancers (e.g., by introducing rules to change the traffic flow), it contacts the box server 2 instead of contacting the Web server 5. The latter forwards the request to the Web server 5 of the Web application 6 (e.g., in standard, reverse-proxy mode).

The method comprises the step of sending a service page code by the box server 2 to the Web server 4 in response to the request. Preferably, the service page code comprises an obfuscated or polymorphic javascript and/or HTML codes. More preferably, the service page code may be different for each user or for each HTTP/HTTPS request.

According to a preferred embodiment, the box server 2 is designed to be installed as a software component in the Web application 6 and/or as a firewall software module and/or load balancer and/or network apparatus and/or a hardware device and/or a software module in the Web server 5 which hosts the Web application 6.

Preferably, the box server 2 is installed in the same network as the Web application 6 (e.g., on-premises) or is provided as an external service (e.g., SaaS or Cloud).

The method further comprises the step of receiving or executing the javascript and/or HTML codes, by the Web browser 4, to automatically generate an asynchronous request, such that the environment data of the Web server 4 may be transmitted to the box server 2.

The method also comprises the step of processing the environment data of the Web browser, by the box server 2, to identify Internet attacks of the Man-in-the-Browser and/or Man-in-the-Middle and/or Bot attack types.

The method comprises the step of performing an encryption function on the server DOM code by the box server 2 to generate an obfuscated DOM code, as well as the step of sending the obfuscated DOM code to the Web browser in response to the asynchronous request.

According to a preferred embodiment, the method comprises the step of performing encryption and/or obfuscation and/or compression and/or encoding functions on the server DOM code by the box server 2, to obtain the obfuscated DOM code. Preferably, the encryption function involves the use of either symmetric or asymmetric keys. For example, the obfuscation methods that are used for the service page code may include replacement of variable and function names, introduction of unused code, encryption, encoding of numbers and strings.

The method also comprises the step of performing a decryption function on the obfuscated DOM code by the service page code, to obtain the server DOM code. In other words, the service page code that is being rendered by the Web browser comprises a code portion which is configured to decrypt the obfuscated DOM code through decryption keys shared with the box server 2.

The method comprises the step of rendering the server DOM code by the Web browser 4.

Referring to the above, the server DOM code (e.g., the HTML code) is received and processed by the rendering engine of the Web browser 4 such that the contents of the Web application 6 may be displayed to the user as hypertext (e.g., a Web page).

Advantageously, with the method of the present invention, no Bot Attack can be made, as the page received from the automatic system that sends the request is the service page code, which relates to a page that has none of the contents of the original Server DOM code obtained from the Web server 5.

Advantageously, the service page code is obfuscated in advanced mode to hinder malware extraction of information that might be used to change the obfuscated server DOM code.

Advantageously, with the method of the present invention no Man-in-the Browser attack can be made, as the malware can only intercept the obfuscated DOM code, which is modified and encrypted and cannot be tampered or replaced.

According to a preferred embodiment, the method comprises the steps of generating the request associated with the Web application 6 by an automatic system, and the step of sending the request and a unique authorization code to the box server 2 by the same automatic system. The method comprises the step of receiving the server DOM code which has been automatically generated by the Web server 5 according to the request, by the box server 2. The method further comprises the step of sending the server DOM code to the automatic system by the box server 2, according to the unique authorization code. Alternatively, the unique authorization code may be replaced with a whitelist, i.e., a list of automatic systems that are authorized to request the server DOM code (see FIG. 3). Preferably, an automatic system comprises authorized systems which can receive the contents of the service provided by the Web server 5. For example, search engines need page contents for page indexing. Advantageously, the method of the present invention does not block these automatic systems, but provides them with the server DOM code if they are in an authorized whitelist and/or if they have a unique authorization code (or security token).

According to a preferred embodiment, the method comprises the step of providing a single-use cryptographic key, by an external device 7a, 7b, to the box server 2 and the Web browser 4. Also, the method comprises the step of performing the encryption function on the server DOM code using the single-use cryptographic key, to generate an obfuscated DOM code. Furthermore, the method comprises the step of performing decryption of the obfuscated DOM code according to the single-use cryptographic key, to obtain the server DOM code. In other words, the single-use cryptographic key required for encryption and decryption is provided by the external device 7a, 7b at each request. This will further increase the security of the system, as encryption keys come from an external system that is immune to malware tampering. For instance, OTK (one-time-key) or OTP (one-time-password) systems are used as single-use cryptographic keys.

According to a preferred arrangement, the method comprises the step of generating a user code associated with a user of the Web browser 4. Furthermore, the method comprises the step of providing the single-use cryptographic key according to the user code.

According to a preferred embodiment of the present invention, the method comprises the step of receiving and rendering the service page code by the Web browser 4. In other words, the rendered service page code results from service page code processing by the rendering engine of the Web browser 4. The method also comprises the step of receiving or processing the javascript and/or HTML codes, by the Web browser 4, to automatically generate the asynchronous request, such that the rendered service page code may be transmitted to the box server 2. Furthermore, the method comprises the step of processing and comparing the rendered service page code and the service page code by an algorithm application 8 residing in the box server 2, such that at least one code difference may be identified.

Therefore, the service page code is the code that may be potentially altered by malware for Man-in-the-Browser and/or Man-in-the-Middle attacks. As mentioned above, malware tampers with the internal functions of the browser (which is also known as hooking) by changing the service page code before it is transferred to the rendering engine of the Web browser 4. Therefore, if the service page code is altered by malware, the rendered service page code is also modified.

According to a preferred embodiment, the method comprises the step of generating an attack-indicative signal, by the box server 2, when the algorithm application 8 identifies at least one code difference between the service page code and the rendered service page code. The method includes the step of sending the attack-indicative signal to the Web browser 4 and/or the step of saving the attack-indicative signal in a database.

According to a preferred arrangement, the method comprises the step of processing the rendered service page code to compare it with the service page code, by a comparison function of the algorithm application 8, to thereby generate at least one attack-indicative signal when the service page code is incompatible with the rendered service page code.

It shall be noted that the service page code is a small code, which only has functional and security purposes. This code is not used for displaying a Web page associated with the Web application 6, but only acts to protect the Web application 6.

Advantageously, the method allows comparison between the service page code and the rendered service page code, to identify any incompatibility between the two codes, associated with the presence of malware in the client computer. Thanks to the method of the present invention, two small codes may be compared, which considerably reduces power and computation time requirements.

According to a preferred embodiment, the method comprises the step of processing the request by the box server 2, to identify and counteract Bot attacks.

According to a preferred embodiment, the box server 2 comprises a traffic analyzer associated therewith, in which the algorithm application 8 resides.

According to a preferred arrangement, the box server 2 and/or the traffic analyzer are software components. More preferably, the box server and/or the traffic analyzer are components of a dedicated server.

Preferably, the box server 2 and the traffic analyzer communicate by sending jobs. These jobs are transmitted through one or more known communication protocols, such as TCP, UDP, HTTP(S) and IMAP.

Advantageously, in the method the traffic analyzer is external to the data flow of HTTP/HTTPS requests, and can act independently of such data flow.

Preferably the server DOM code is a HTML code and/or a javascript code associated with the request.

Preferably, the service page code is a HTML code and/or a javascript code.

According to a preferred embodiment, the service page code is a preset code, which is preferably configured to provide at least one instruction to the Web browser to send the rendered service page code to the box server 2.

Preferably, the algorithm application 8 is configured to process the rendered service page code and compare it with the service page code to identify at least one code difference. Preferably, the algorithm application 8 is configured to generate an attack-indicative signal (e.g., MitB Alert, BOT alert), when it identifies at least one code difference that can be related to an Internet attack, such as a Man-in-the-Browser (MitB) attack.

According to a preferred arrangement, the algorithm application 8 processes the rendered service page code to provide an estimate of the expected service page code. More in detail, the algorithm application 8 is configured to provide an estimate of the expected service page code that has been processed by the rendering engine of the Web browser 4 to generate the rendered service page code. The expected service page code is compared with the original service page code (i.e., the one that was originally received by the client computer 3) to identify the compatibility between the two codes. In other words, the two expected/original service page codes are either identical and coincident, if no change has been made to the code before rendering, or similar and compatible if code differences are not caused by the presence of malware.

According to the present invention, the two expected/original service page codes will be intended to be incompatible when the algorithm application 8 identified at least one code difference that may be related to an Internet attack (such as a MitB attack).

Preferably, the algorithm application 8 is manually implemented by a programmer or by means of a learning system, and hence it is variable with time (polymorphism). More preferably, the learning system whereby the algorithm application 8 is implemented is based, for instance, on statistical analysis of the particular behavior of the Web browser 4 (e.g., indicating User Agent Spoofing)

As used in the present invention, the term algorithm application 8 is intended to designate a program or a series of programs that are being executed in the box server 2 (or the traffic analyzer) to allow comparison of the service page code with the rendered service page code to check for incompatibility therebetween. Particularly, the algorithm application 8 is a program or a series of programs that can process the service page code to make it comparable with the rendered service page code. For example, the algorithm uses a preset and appropriately configured function to provide an estimate of the expected service page code (i.e., the code that has been potentially changed by the malware) that has been received and processed by the rendering engine of the Web browser 4. This preset function changes with time (polymorphism) due to a learning mechanism which accounts for the behavior of the particular Web browser for which it has been implemented. This means that the preset function is specific for each Web browser 4, as each Web browser 4 renders the service page code in its specific manner. In other words, the preset function of the algorithm application 8 performs an "inverse function" of the rendered service page code. Thus, once it has received the rendered service code, it can provide an estimate of the expected service page code that has been actually processed by the Web browser 4. This is possible because the preset function accounts for the behavior of the Web browser 4.

According to a preferred embodiment, the method comprises the step of processing the rendered service page code to compare it with the service page code, by a comparison function of the algorithm application 8, to thereby generate at least one attack-indicative signal when the service page code is incompatible with the rendered service page code.

According to a preferred embodiment, the method comprises a step in which the traffic analyzer acquires data and starts an analysis based on the algorithm application 8.

According to an alternative embodiment of the present invention, the algorithm 8 may use known techniques to check whether the rendered service code page that has been received by the Web browser 4 matches the expected one.

One example of a known technique is heuristic analysis of the code received in the Web browser, as described in "Detecting client-side e-banking fraud using a heuristic model", T. Timmermans and J. Kloosterman, University of Amsterdam, Jul. 11, 2013.

A further example is the method as disclosed in U.S. Patent Application Publication No. US2011/0239300A1, in which a check code is distributed with the service page. This check code checks for the presence of certain known malware within the code in the Web browser.

According to a preferred arrangement provided by the present invention, the method as disclosed in the U.S. Provisional Application No. 62/079,337 by the Applicant hereof, may be used, in which the rendered service page code is sent to the traffic analyzer. The traffic analyzer checks, using the algorithm application 8, whether the original service page code that has been received is compatible with the rendered service page code that has been sent by the Web browser 4 for malware identification.

Advantageously the method provides a comprehensive overview of what happens during a web browsing session, because it analyses the individual HTTP/HTTPS requests.

Advantageously, the method of the present invention allows effective and secure identification and counteraction of Man-in-the-Browser and/or Man-in-the-Middle and/or Bot attacks, thereby affording full monitoring of user requests.

According to a preferred embodiment, the step of receiving and processing the service page code for automatic generation of the rendered service page code comprises the steps of:

receiving the service page code by the Web browser 4, processing the obfuscated and polymorphic javascript and/or HTML codes in the service page code, by the Web browser 4, to automatically generate the rendered service page code, processing the obfuscated and polymorphic javascript and/or HTML codes in the service page code, by the Web browser 4, to send the rendered service page code to the box server 2.

A few application examples of the method of the present invention are described below.

Example 1

See FIG. 2 for the following application example of the method of the present invention. This method comprises the following steps:

a. The user requests a page of the Website of interest (i.e., the Web application 6), and a HTTP or HTTPS request is thus generated by the Web browser 4 of the user, which is directed to a box server 2 (installed at the premises of the Web application owner or available in a Cloud environment);

b. The box server 2 acts as a reverse proxy system, reads the hostname, and checks the original hostname of the location of the web application 6 against its configuration keys. It forwards the HTTP or HTTPS request and obtains the server DOM code (/including the http/https headers and cookies) of the requested page;

c. The box server 2 randomly generates a UID (user ID). If the user has already made requests, it reads the UID that has been sent by the client, for instance through a cookie contained and pre-registered in the browser of the user, or generates and sends a new one;

d. The box server 2 randomly assigns a unique HID (request code) to each individual HTTP or HTTPS request;

e. The box server 2 sends the user a service page containing the obfuscated and polymorphic javascript and/or HTML codes to increase the security level of the page;

f. The box server 2 applies encryption and/or obfuscation and/or compression and/or encoding functions to the original server DOM code that has been transmitted by the Web server 5 of the Web application 6;

g. The service page that is being rendered by the Web browser 4 of the user 4 makes an asynchronous request to the box server 2 and transmits environment information of the Web browser 4 and/or the rendered service page code;

h. The box server receives the asynchronous request from the service page and performs an algorithm function 4 to check for integrity and security of the Web browser environment 4 of the user;

i. Based on security rules, the box server 2 transmits the server DOM code, obfuscated under f), in response to the asynchronous call of the service page;

j. The service page receives the obfuscated server DOM code (i.e., changed under f)), performs an inverse function to obtain the original server DOM code, and replaces the service page with the original page associated with the server DOM code.

Example 2

Figure 3:
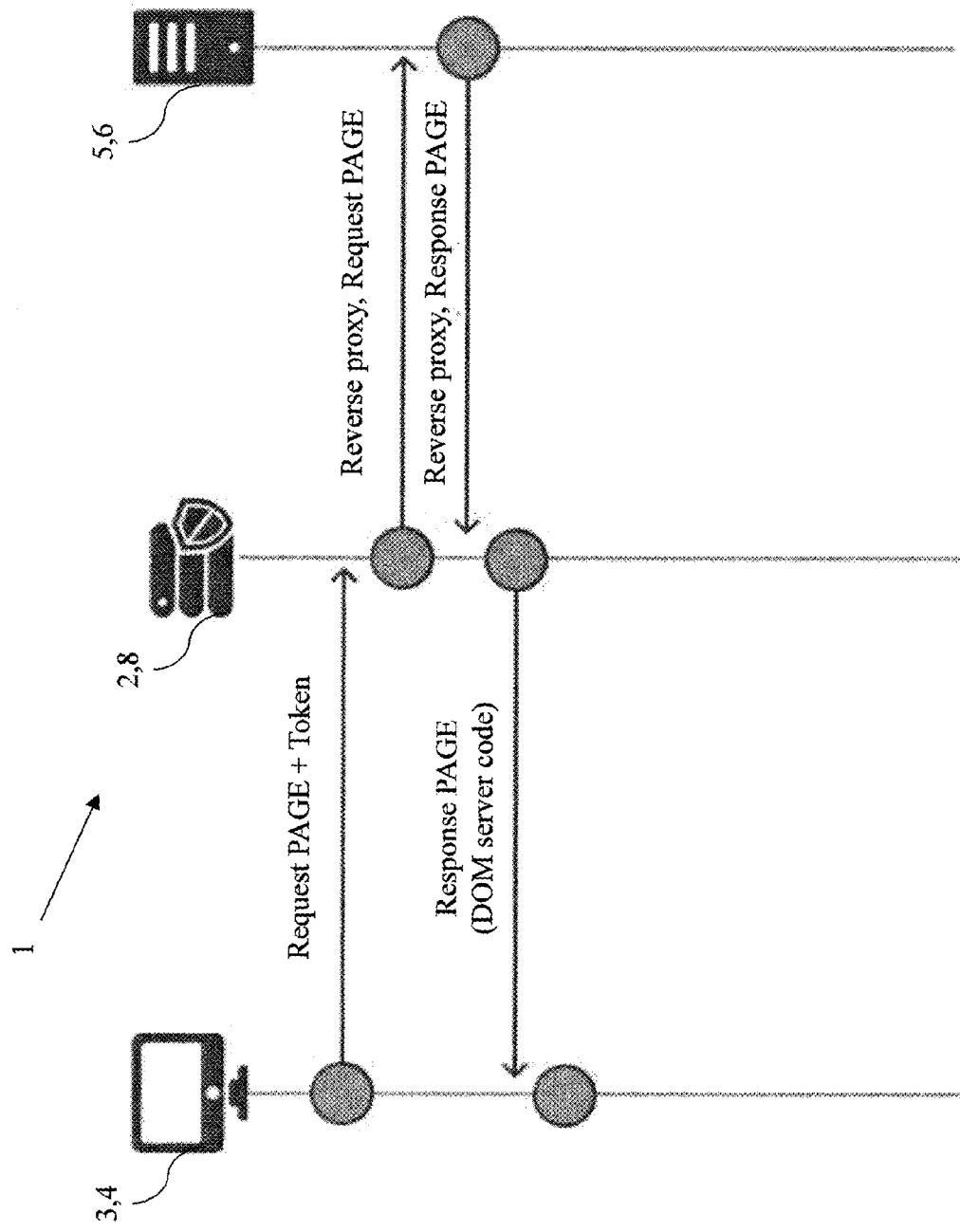
FIG. 3 shows a further flowchart of an example of the method of identifying and counteracting Internet attacks, according to the present disclosure.

Referring to FIG. 3, in case of requests sent by authorized automatic systems, the method includes the following steps:

a. The authorized automatic system requires a page of the Website of interest, a HTTP or HTTPS request is made to a box server 2 and at the same time a unique authorization code (token) is transmitted, for instance within a HTTP header of the request;

b. The box server 2 checks whether the toke is valid and blocks communication if it is not. If the token is valid, it forwards the HTTP or HTTPS request and obtains the original Server DOM code of the requested page:

c. The box server 2, transmits the original server DOM code to the automatic system that had requested it;

d. The automatic system receives the original server DOM code and uses it as needed.

For example, another method of accepting requests by automatic systems (e.g., indexing crawlers) consists in checking whether the IP address of the requester is in a whitelist or performing a reverse check of the hostname from the IP.

Example 3

Figure 4:
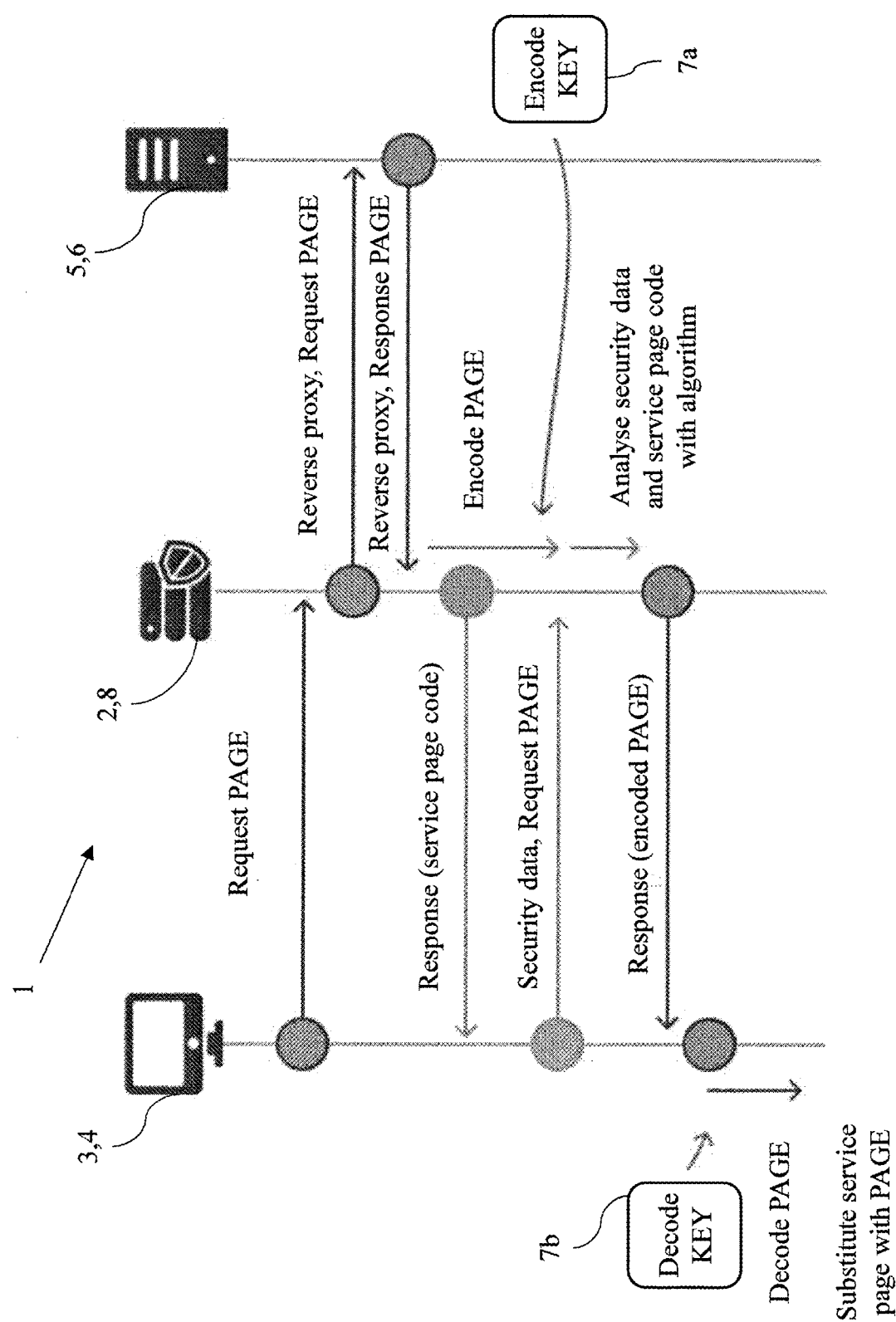
FIG. 4 shows a flowchart of a particular step of an example of the method of identifying and counteracting Internet attacks, according to the present disclosure.

Referring to FIG. 4, encoding and/or encryption keys may be also exchanged by external devices 7a, 7b, which are linked by a secret shared between the box server 2 and the external devices 7a, 7b. For instance, OTK (one-time-key) or OTP (one-time-password) systems are used. The method of the example of FIG. 4 comprises the following steps:

Steps a) to e) of the Example 1 are carried out;

f. The box server 2 applies encryption and/or obfuscation and/or compression and/or encoding functions to the original server DOM code that has been transmitted by the Web server 5 of the Web application 6. This step requires a single-use key, which is generated according to page-requesting user.

Steps g) to i) of the Example 1 are carried out;

The service page receives the obfuscated server DOM code (i.e., changed under f)) performs an inverse function to obtain the original server DOM code, and replaces the service page with the original page associated with the server DOM code. In order to perform the inverse function, the service page uses a single-use key generated by an external device 7b. Such key is equal or related to the key that was used to make the changes under f).

For instance, the external device 7b that was used to generate the decryption key interfaces with the service page by a plug-in installed in the Web browser 4 of the user or using the audio input interface.

Advantageously the system 1 provides a comprehensive overview of what happens during a web session, because it analyses the individual requests.

For example, the method can detect:

Whether the request comes from a human user or a BOT;

Whether the request has "reasonable" or "unreasonable" timings;

The User Agent and IP from which the request comes;

The UID from which the request comes.

Advantageously, the method of the present invention affords full tracking of the user (i.e., the client user), and session monitoring.

Advantageously, the method of the present invention allows effective and secure identification and counteraction of Man-in-the-Browser and/or Man-in-the-Middle attacks, thereby affording full monitoring of user requests.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of identifying and counteracting Internet attacks, of Man-in-the-Browser and/or Man-in-the-Middle and/or Bot attack types, comprising:

generating a request by a Web browser, concerning a Web application residing in a Web server, sending said request by said Web browser to a box server, which is in signal communication with said Web server, receiving a server document object model (DOM) code by said box server, which code has been automatically generated by said Web server according to said request, sending a service page code by said box server to said Web browser, in response to said request, said service page code comprising an obfuscated and polymorphic javascript code and/or HTML code, receiving and rendering said service page code by said Web browser, receiving and processing said javascript code and/or HTML code, by said Web browser, to automatically generate an asynchronous request, wherein environment data of said Web browser is transmitted to said box server and said rendered service page code may be transmitted to said box server, processing said environment data of said Web browser, by said box server, to identify Internet attacks of the Man-in-the-Browser and/or Man-in-the-Middle and/or Bot attack types, processing and comparing said rendered service page code and said service page code by an algorithm application residing in said box server, such that at least one code difference may be identified, and processing said rendered service page code to compare it with said service page code, by a comparison function of said algorithm application, to thereby generate at least one Man-in-the-Browser and/or Man-in-the-Middle and/or Bot attack-indicative signal when said service page code is incompatible with said rendered service page code, performing an encryption function on said server DOM code by said box server to generate an obfuscated DOM code, and sending said obfuscated DOM code to said Web browser in response to said asynchronous request, performing a decryption function on said obfuscated DOM code by said service page code, to obtain said server DOM code, and rendering said server DOM code by said Web browser.

2. The method as claimed in claim 1, further comprising:

generating a request associated with said Web application by an automatic system, sending said request and a unique authorization code to said box server by said same automatic system, receiving said server DOM code by said box server, which code has been automatically generated by said Web server according to said request, and sending said server DOM code to said automatic system by said box server, according to said unique authorization code.

3. The method as claimed in claim 1, further comprising:

providing a single-use cryptographic key, by an external device, to said box server and to said Web browser, performing said encryption function on said server DOM code using said single-use cryptographic key, to generate an obfuscated DOM code, and performing said decryption function on said obfuscated DOM code according to said single-use cryptographic key, to obtain said server DOM code.

4. The method as claimed in claim 3, further comprising:

generating a user code by said box server, which code is associated with a user of said Web browser, and providing said single-use cryptographic key according to said user code.

5. The method as claimed in claim 1, further comprising:

sending said attack-indicative signal to said web browser and/or saving said attack-indicative signal in a database.

6. The method as claimed in claim 1, further comprising:

processing said request by said box server, to identify and counteract Bot attacks.

7. The method as claimed in claim 1, further comprising:

performing encryption and/or obfuscation and/or compression and/or encoding functions on said server DOM code, to generate said obfuscated DOM code.

8. A system for identifying and counteracting Internet attacks, of Man-in-the-Browser and/or Man-in-the-Middle and/or Bot attack types, the system comprising:

a box server programmed with instructions for:

receiving a request generated by a Web browser, concerning a Web application residing in a Web server, receiving a server document object model (DOM) code automatically generated by said Web server according to said request, sending a service page code to said Web browser, in response to said request, said service page code comprising an obfuscated and polymorphic JavaScript code and/or HTML code, receiving environment data of said Web browser and a rendered service page code, wherein said Web browser has received and rendered said service page code and has received and processed said JavaScript code and/or HTML code to automatically generate an asynchronous request, processing said environment data of said Web browser to identify Internet attacks of the Man-in-the-Browser and/or Man-in-the-Middle and/or Bot attack types, processing and comparing said rendered service page code and said service page code by an algorithm application residing in said box server, such that at least one code difference may be identified, and processing said rendered service page code to compare it with said service page code, by a comparison function of said algorithm application, to thereby generate at least one Man-in-the-Browser and/or Man-in-the-Middle and/or Bot attack-indicative signal when said service page code is incompatible with said rendered service page code, performing an encryption function on said server DOM code to generate an obfuscated DOM code, sending said obfuscated DOM code to said Web browser in response to said asynchronous request, and said service page code programmed for performing a decryption function on said obfuscated DOM code to obtain said server DOM code.

9. The system as claimed in claim 8, further comprising the box server programmed with instructions for:

receiving a request generated in association with said Web application by an automatic system, receiving a unique authorization code transmitted by said automatic system, receiving said server DOM code, which code has been automatically generated by said Web server according to said request, and sending said server DOM code to said automatic system according to said unique authorization code.

10. The system as claimed in claim 8, further comprising:

an external device programmed with instructions for providing a single-use cryptographic key to said box server and to said Web browser, said box server programmed with instructions for performing said encryption function on said server DOM code using said single-use cryptographic key, to generate an obfuscated DOM code, and said service page code programmed with instructions for performing said decryption function on said obfuscated DOM code according to said single-use cryptographic key, to obtain said server DOM code.

11. The system as claimed in claim 10, further comprising:

said box server programmed with instructions for generating a user code, which code is associated with a user of said Web browser, and said external device programmed with instructions for providing said single-use cryptographic key according to said user code.

12. The system as claimed in claim 8, further comprising said box server programmed with instructions for:

sending said attack-indicative signal to said Web browser and/or saving said attack-indicative signal in a database.

13. The system as claimed in claim 8, further comprising said box server programmed with instructions for processing said request to identify and counteract Bot attacks.

14. The system as claimed in claim 8, further comprising said box server programmed with instructions for performing encryption and/or obfuscation and/or compression and/or encoding functions on said server DOM code, to generate said obfuscated DOM code.

* * * * *